(12) United States Patent
Saeki

(10) Patent No.: US 8,910,737 B2
(45) Date of Patent: Dec. 16, 2014

(54) SERVICE HOLE COVER MOUNTING STRUCTURE, AND VEHICULAR BATTERY MOUNTING STRUCTURE PROVIDED THEREWITH

(71) Applicant: Koji Saeki, Toyota (JP)

(72) Inventor: Koji Saeki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 64 days.

(21) Appl. No.: 13/683,310

(22) Filed: Nov. 21, 2012

(65) Prior Publication Data
US 2013/0127200 A1 May 23, 2013

(30) Foreign Application Priority Data
Nov. 22, 2011 (JP) ................................ 2011-255321

(51) Int. Cl.
B60K 1/04 (2006.01)

(52) U.S. Cl.
CPC ........... *B60K 1/04* (2013.01); *B60K 2001/0438* (2013.01)
USPC ....................................... 180/68.5; 296/37.14

(58) Field of Classification Search
CPC .................................. B60K 1/04; B60L 11/18
USPC ........... 180/68.5; 296/37.14, 193.07; 224/902
See application file for complete search history.

(56) References Cited

U.S. PATENT DOCUMENTS

| 7,621,373 B2* | 11/2009 | Helferty ........................ 181/268 |
| 7,637,560 B2* | 12/2009 | Murase .................... 296/193.07 |
| 8,567,543 B2* | 10/2013 | Kubota et al. ................ 180/68.5 |
| 2009/0242299 A1* | 10/2009 | Takasaki et al. ............. 180/68.5 |
| 2012/0160584 A1* | 6/2012 | Nitawaki ..................... 180/68.5 |
| 2013/0037336 A1* | 2/2013 | Ojeda et al. .................. 180/68.5 |

FOREIGN PATENT DOCUMENTS

JP 2009-83601 4/2009

* cited by examiner

*Primary Examiner* — John Walters
*Assistant Examiner* — Brian Swenson
(74) *Attorney, Agent, or Firm* — Oblon, Spivak, McClelland, Maier & Neustadt, L.L.P.

(57) ABSTRACT

A service hole cover has a housing recessed portion that has been brought from above the vehicle floor toward the battery unit through the service hole through a service hole formed in a floor panel from inside a vehicle cabin, and that covers an upper portion of a power supply circuit interrupting device from the floor panel side. An extended portion that extends toward an outside of the housing recessed portion is provided on a lower end portion of an inner peripheral wall portion of this housing recessed portion. Also, a bent-back portion that is bent back toward the floor panel side is provided on an outer peripheral side end portion of the extended portion. This bent-back portion will easily deform toward the inner peripheral wall portion side of the housing recessed portion with the outer peripheral side end portion of the extended portion as the fulcrum.

13 Claims, 3 Drawing Sheets

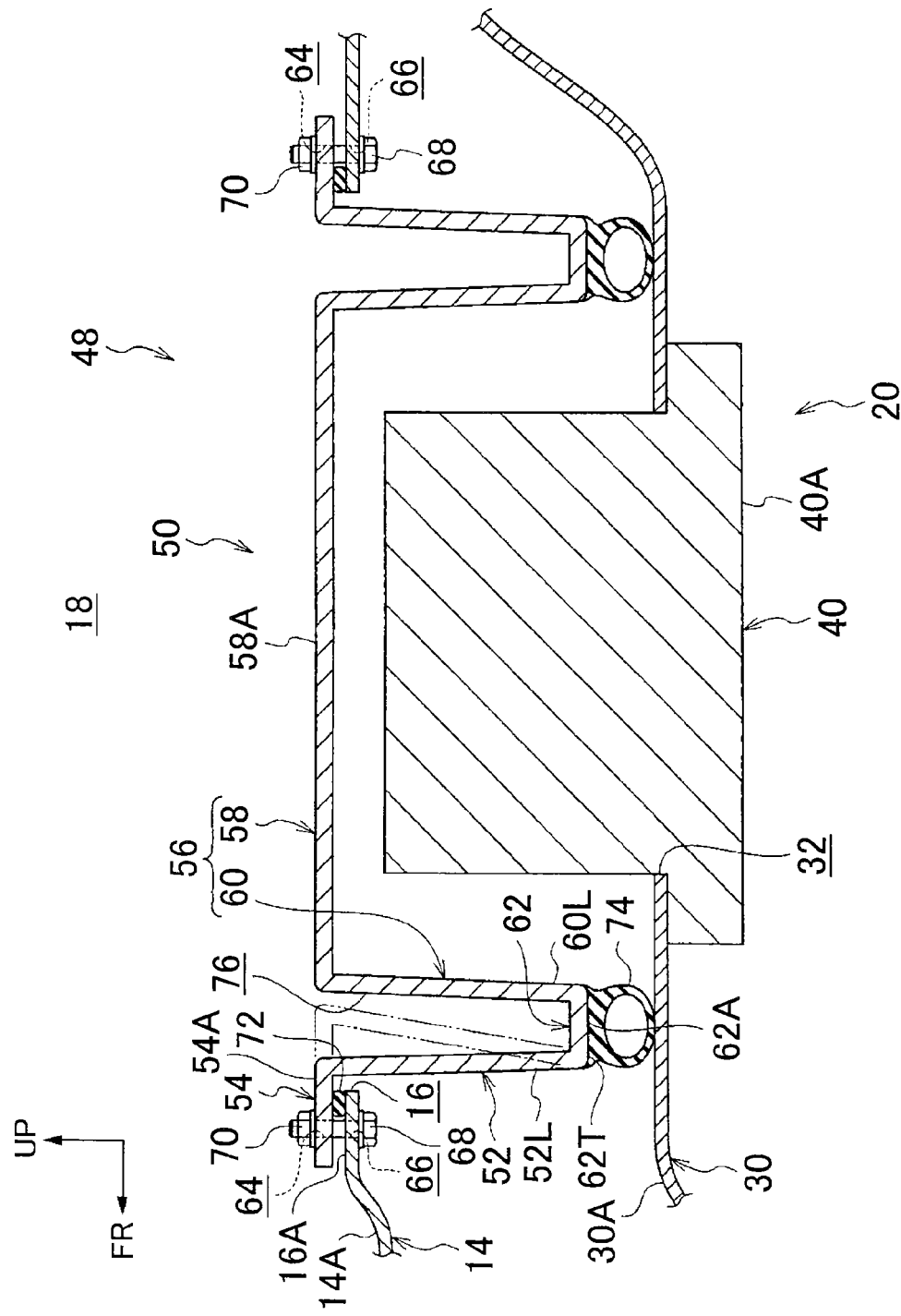

SERVICE HOLE COVER MOUNTING STRUCTURE, AND VEHICULAR BATTERY MOUNTING STRUCTURE PROVIDED THEREWITH

INCORPORATION BY REFERENCE

The disclosure of Japanese Patent Application No. 2011-255321 filed on Nov. 22, 2011 including the specification, drawings and abstract is incorporated herein by reference in its entirety.

BACKGROUND OF THE INVENTION

1. Field of the Invention

The invention relates to a service hole cover mounting structure, and a vehicular battery mounting structure provided with this service hole cover mounting structure.

2. Description of the Related Art

Japanese Patent Application Publication No. 2009-083601 (JP 2009-083601 A), for example, describes an electric vehicle in which a battery unit having a service plug is mounted under a floor panel. The electric vehicle described in JP 2009-083601 A includes a boot member that is arranged between a boot mounting hole formed in the floor panel and a service plug opening formed in an upper surface of the battery unit, and a cap member that covers the boot mounting hole. The boot member is made of synthetic rubber and formed in a bellows-shape. An operating lever for operating the service plug is housed inside this boot member.

However, with the technology described in JP 2009-083601 A, if the floor panel is displaced horizontally with respect to the battery unit when a vehicle collision occurs, the boot member may become tilted with respect to the operating lever, and the boot member may contact the operating lever.

SUMMARY OF THE INVENTION

The invention thus provides a service hole cover mounting structure capable of inhibiting contact between a service hole cover and an operating portion of a battery unit when a vehicle collision occurs, as well as a vehicular battery mounting structure provided with this service hole cover mounting structure.

A first aspect of the invention relates to a service hole cover mounting structure that includes a vehicle floor and a service hole cover. A service hole is formed in the vehicle floor. A battery unit is below the vehicle floor in the vehicle vertical direction. The battery unit has an operating portion that protrudes toward the service hole. The service hole cover includes a housing recessed portion that is arranged in the service hole and that covers the operating portion, and a bent-back portion that is bent back toward an outside of the housing recessed portion and toward the vehicle floor side from a lower end portion of the housing recessed portion, and that attaches to the vehicle floor.

According to this service hole cover mounting structure, the bent-back portion of the service hole cover is bent back toward the outside of the housing recessed portion and toward the vehicle floor side from the lower end portion of the housing recessed portion that covers the operating portion of the battery unit. Therefore, for example, if the vehicle floor is displaced horizontally with respect to the battery unit due to a vehicle collision, and the bent-back portion is consequently pressed toward the operating portion of the battery unit by the vehicle floor, the bent-back portion will deform toward the housing recessed portion side. As a result, the horizontal displacement of the vehicle floor with respect to the battery unit is absorbed, so a shift in the position of the housing recessed portion in the horizontal direction with respect to the operating portion is inhibited. Therefore, contact between the housing recessed portion and the operating portion of the battery unit is able to be inhibited.

The service hole cover may have an extended portion that extends toward the outside of the housing recessed portion from the lower end portion of the housing recessed portion, and the service hole cover mounting structure may also include a first seal member that is provided in a gap between the extended portion and the battery unit, and that fills in the gap. The bent-back portion may be bent back from the lower end portion of the housing recessed portion toward the vehicle floor side via the extended portion, and the first seal member may be provided along the extended portion.

According to the structure described above, the bent-back portion is bent back from the lower end portion of the housing recessed portion toward the vehicle floor side via the extended portion that extends toward the outside of the housing recessed portion, and the first seal member is provided in the gap between this extended portion and the battery unit. This first seal member is provided along the extended portion, and fills in the gap between the extended portion and the battery unit. As a result, rainwater and dust and the like are inhibited from entering the housing recessed portion. Therefore, the durability of the battery unit improves.

Also, when the service hole cover is attached to the vehicle floor, the extended portion is supported by the battery unit via the first seal member. As a result, horizontal displacement of the extended member with respect to the battery unit is inhibited. Therefore, when the bent-back portion is pressed toward the operating portion of the battery unit by the vehicle floor, the bent-back portion will more easily deform toward the housing recessed portion side with the extended portion as the fulcrum. Therefore, contact between the housing recessed portion and the operating portion of the battery unit is able to be inhibited.

The service hole cover may have a fixing portion that is provided on an upper end portion of the bent-back portion, and is fixed to an upper surface of the vehicle floor, and the service hole cover structure may also include a second seal member that is provided along the fixing portion, and fills in a gap between the fixing portion and the upper surface of the vehicle floor.

Rainwater and dust and the like are inhibited from entering the vehicle cabin by providing the second seal member that fills in the gap between the fixing portion of the service hole cover and the upper surface of the vehicle floor. Therefore, the inside of the vehicle cabin is inhibited from becoming dirty and the like.

A top portion of the housing recessed portion may be arranged in a position that is the same height as the fixing portion or in a position that is lower than the fixing portion.

According to the structure described above, for example, even if the service hole cover is stepped on by an occupant, the top portion of the housing recessed portion is inhibited from being pressed toward the battery unit side. Therefore, damage or the like to the service hole cover is inhibited.

A second aspect of the invention relates to a vehicular battery mounting structure that includes the service hole cover mounting structure described above, and the battery unit that has the operating portion that protrudes toward the service hole, and that is arranged below the vehicle floor in the vehicle vertical direction.

According to the battery mounting structure described above, contact between the housing recessed portion of the service hole cover and the operating portion of the battery unit when a vehicle collision occurs is able to be inhibited by providing the service hole cover mounting structure described above. Therefore, the durability of the battery unit is able to be improved.

The battery unit may have a battery module, and a service plug that electrically interrupts an electrical circuit of the battery module, and the operating portion may have an operating member that is connected to the service plug, and that causes the service plug to electrically interrupt the electrical circuit by being operated.

According to the battery mounting structure described above, during maintenance of the battery unit, the electrical circuit of the battery module is able to be electrically interrupted by removing the service hole cover from the vehicle floor and operating the operating member of the operating portion of the battery unit through the service hole. Therefore, the ability to perform maintenance on the battery unit improves.

A second aspect of the invention relates to a service hole cover mounting structure that includes a vehicle floor and a service hole cover. The vehicle floor has a service hole. The service hole cover includes a housing recessed portion and an outer housing portion. The housing recessed portion is arranged in the service hole and covers an operating portion of a battery unit that protrudes toward the service hole. A first end of the outer housing portion is continuous with a lower end portion of the housing recessed portion. A second end of the outer housing portion attaches to the vehicle floor. The outer housing portion is arranged outside the housing recessed portion. A space is provided between an outer periphery of the housing recessed portion and an inner periphery of the outer housing portion.

As described above, the service hole cover mounting structure and the vehicular battery mounting structure provided with this service hole cover mounting structure according to the invention are able to inhibit contact between the service hole cover and the operating portion of the battery unit when a vehicle collision occurs.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3 is an enlarged sectional view of the service hole cover shown in FIG. 1.

DETAILED DESCRIPTION OF EMBODIMENTS

Figure 1:
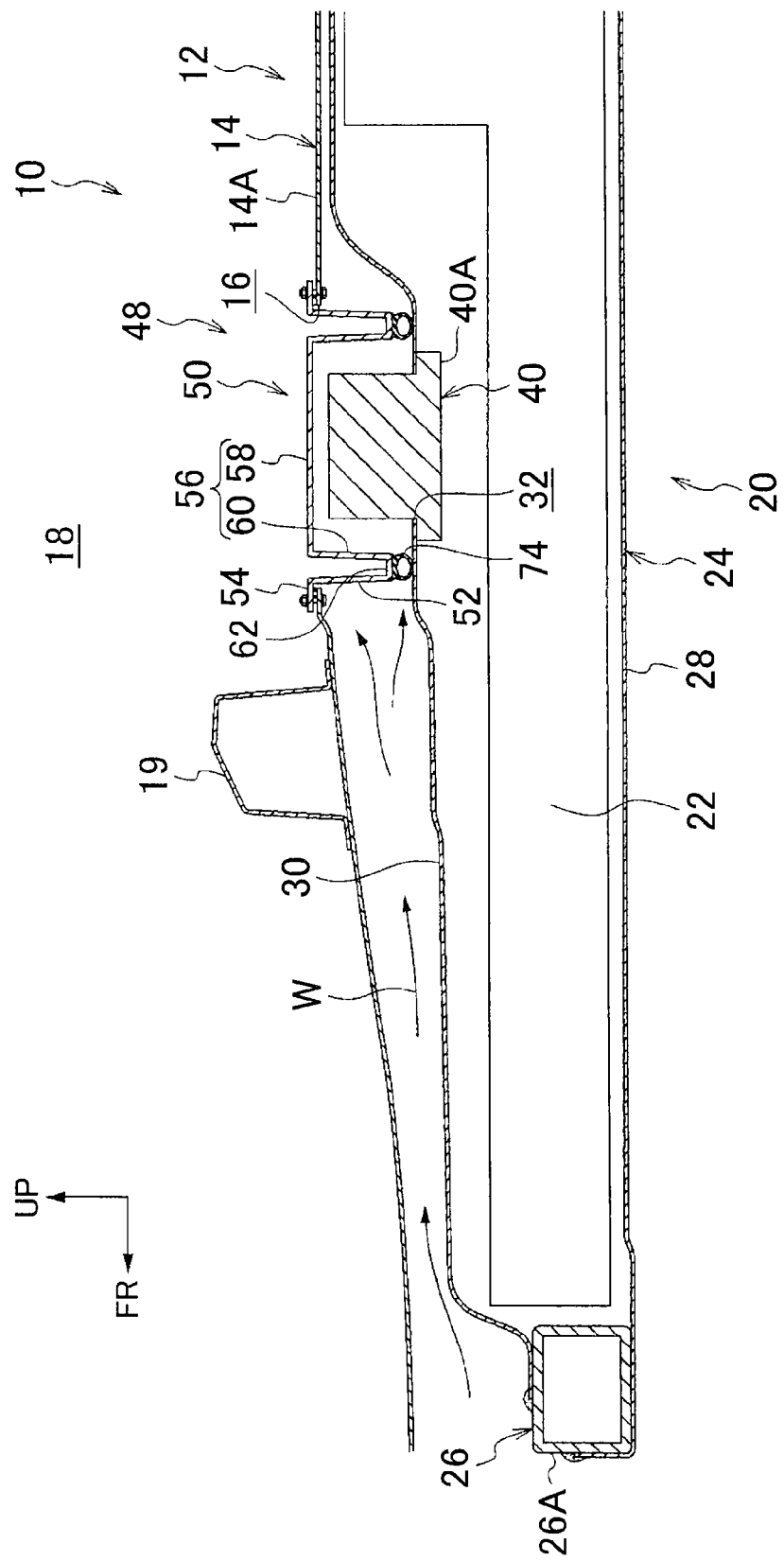
FIG. 1 is a longitudinal sectional view, as viewed from the outside in a vehicle body width direction, of a lower portion of a vehicle to which a vehicular battery mounting structure according to one example embodiment of the invention has been applied.

Hereinafter, example embodiments of the invention will be described with reference to the accompanying drawings. In the drawings, the arrow FR indicates the forward direction in a vehicle longitudinal direction, and the arrow UP indicates the upward direction in a vehicle vertical direction.

FIG. 1 is a longitudinal sectional view, as viewed from the outside in a vehicle width direction (i.e., the left side of the vehicle body), of a lower portion of a vehicle 12 to which a vehicular battery mounting structure 10 according to one example embodiment has been applied. This vehicle 12 may be, for example, an electric vehicle, a gasoline hybrid vehicle, or a fuel cell hybrid vehicle or the like, that runs using an electric motor, not shown, as a drive source. A battery unit 20 that stores electric power to be supplied to the electric motor is mounted below, in the vehicle vertical direction, a floor panel 14 that serves as the vehicle floor.

As shown in FIG. 1, the battery unit 20 includes a battery module 22, a battery case 24 in which the battery module 22 is housed, and a power supply circuit interrupting device 40 that electrically interrupts an electrical circuit, not shown, of the battery module 22. The battery module 22 is a secondary battery that stores electric power to be supplied to the electric motor, not shown, described above, and is housed inside the battery case 24.

The battery case 24 includes a battery frame 26 that forms a frame of the battery case 24, a battery lower cover 28 that forms a bottom wall of the battery case 24, and a battery upper cover 30 that forms a top wall of the battery case 24. The battery frame 26 includes a pair of frames, i.e., a front frame 26A and a rear frame, not shown, that are provided one on each side of the battery module 22 in the vehicle longitudinal direction and that extend in the vehicle width direction, and a pair of side frames, not shown, provided one on each side of the battery module 22 in the vehicle width direction and that extend in the vehicle longitudinal direction. The battery frame 26 is formed in an overall frame-shape. The battery unit 20 is attached via this battery frame 26 to a frame member (such as a rocker, for example) that forms a lower portion of the vehicle body.

Also, the battery lower cover 28 is attached by welding or the like to the battery frame 26 from below in the vehicle vertical direction, and the battery upper cover 30 is attached by welding or the like to the battery frame 26 from above in the vehicle vertical direction. The battery module 22 is thus covered from both sides in the vehicle vertical direction by the battery lower cover 28 and the battery upper cover 30. As a result, rainwater and dust are prevented from entering the battery case 24.

The power supply circuit interrupting device 40 that serves as an operating portion is provided on an upper portion of the battery case 24. The power supply circuit interrupting device 40 has a case 40A, a service plug, not shown, that is housed in the case 40A and electrically interrupts the electrical circuit connected to the battery module 22 described above, and an operating member, not shown, such as an operating lever that is connected to the service plug. An upper portion of the case 40A protrudes toward the floor panel 14 side through an opening 32 formed in the battery upper cover 30, so the operating member, not shown, that is housed inside the case 40A is able to be controlled from outside the battery case 24. The electrical circuit of the battery module 22 is electrically interrupted by an operator operating this operating member.

Meanwhile, a service hole 16 is formed in the floor panel 14, in a position facing the power supply circuit interrupting device 40. In other words, the power supply circuit interrupting device 40 protrudes from the battery upper cover 30 of the battery unit 20 toward the service hole 16. The service hole 16 is a generally rectangular through-hole that passes through the floor panel 14 in the plate thickness direction. The operator is able to operate the operating member of the power supply circuit interrupting device 40 from a vehicle cabin 18 side through this service hole 16. A reinforcing member 19 that extends in the vehicle width direction is provided as appropriate on an upper surface 14A of the floor panel 14.

Figure 2:
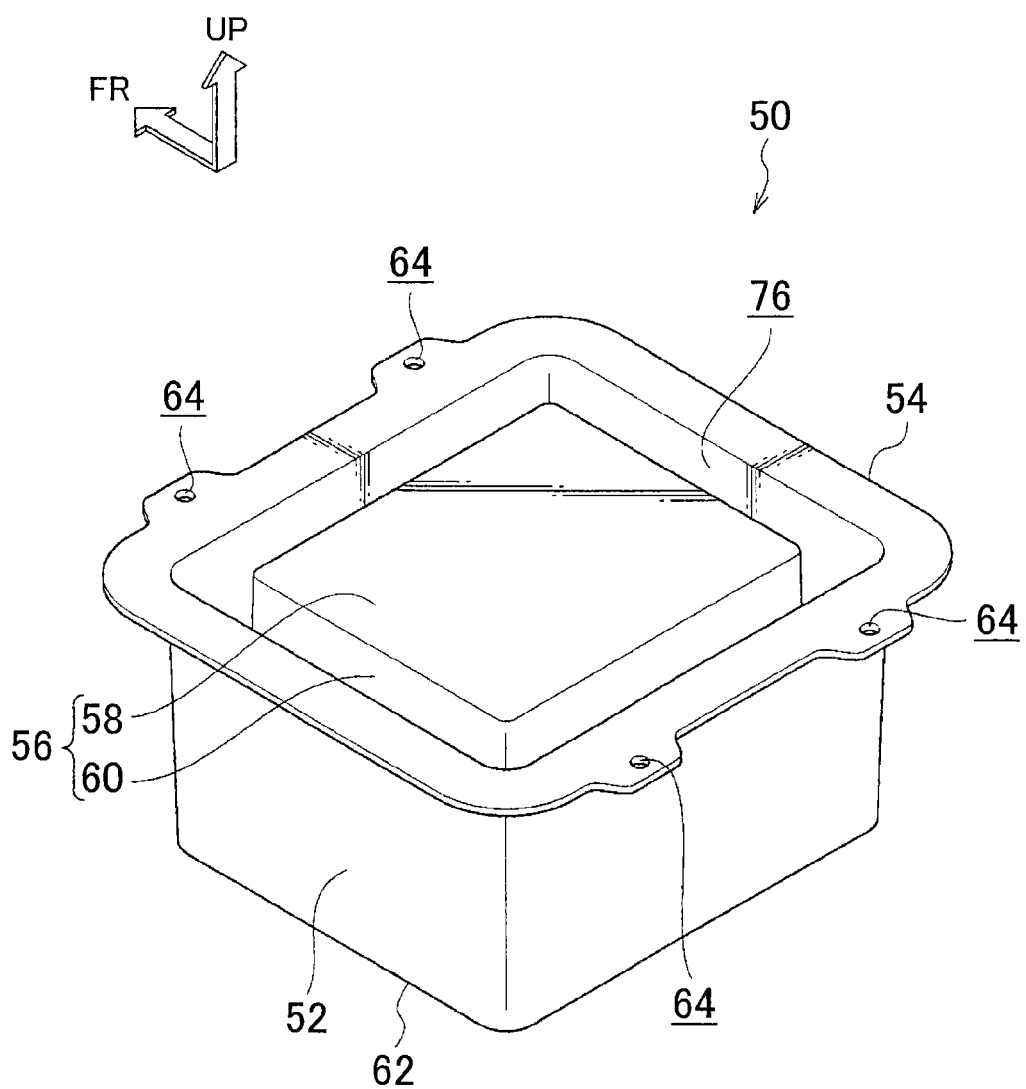
FIG. 2 is an enlarged perspective view of a service hole cover according to the example embodiment of the invention.

A service hole cover 50 that covers the service hole 16 is detachably attached to the floor panel 14. A service hole cover mounting structure 48 according to this example embodiment is applied to the floor panel 14 and the service hole cover 50. As shown in FIG. 2, the service hole cover 50 is formed in an overall box-shape by a die-molded article that is made of resin or metal, with the lower side in the vehicle vertical direction (i.e., the battery unit 20 side in FIG. 1) being open. This service hole cover 50 has a housing recessed portion 56, an extended portion 62, a bent-back portion 52, and a flange portion 54 that serves as a fixing portion. The housing recessed portion 56, the extended portion 62, the bent-back portion 52, and the flange portion 54 are integrally formed by die molding or the like.

As shown in FIG. 3, the housing recessed portion 56 is formed in a box-shape with the battery unit 20 side (i.e., the lower side in the vehicle vertical direction) being open. This housing recessed portion 56 is arranged, with facing the battery unit 20, through the service hole 16 in the floor panel 14 from inside the vehicle cabin 18 (i.e., from above the floor panel 14), so as to cover the upper portion of the power supply circuit interrupting device 40 from the floor panel 14 side. Namely, this housing recessed portion 56 is arranged in the service hole 16. This housing recessed portion 56 has a top wall portion 58 that serves as a top portion, and an inner peripheral wall portion 60.

The top wall portion 58 of the housing recessed portion 56 is formed in a flat-plate shape, and faces the battery upper cover 30 of the battery unit 20 when the flange portion 54, that will be described later, is fixed to an edge portion 16A of the service hole 16. Also, the top wall portion 58 is arranged at the same height as the flange portion 54. That is, an upper surface 58A of the top wall portion 58 is flush with an upper surface 54A of the flange portion 54, so the top wall portion 58 does not protrude toward the vehicle cabin 18 side (i.e., upward in the vehicle vertical direction) from the flange portion 54. The phrase "the top wall portion 58 is arranged at the same height as the flange portion 54" here is a concept that includes not only a structure in which the upper surface 58A of the top wall portion 58 and the upper surface 54A of the flange portion 54 are positioned on completely the same plane, but also a structure in which a slight step is formed between the upper surface 58A of the top wall portion 58 and the upper surface 54A of the flange portion 54 due to manufacturing error or the like.

The inner peripheral wall portion 60 that extends from an outer peripheral portion of the top wall portion 58 toward the battery unit 20 side is formed on the outer peripheral portion of the top wall portion 58. The transverse section of the inner peripheral wall portion 60 is formed in a rectangular tube-shape, and the extended portion 62 is provided on a lower end portion 60L of the inner peripheral wall portion 60. The extended portion 62 extends from the lower end portion 60L of the housing recessed portion 56 toward the outside (i.e., the bent-back portion 52 side) of the housing recessed portion 56, and extends in an annular shape along the lower end portion 60L. Also, when the flange portion 54 that will be described later is fixed to the edge portion 16A of the service hole 16, a lower surface 62A of the extended portion 62 faces an upper surface 30A of the battery upper cover 30 of the battery unit 20, and the housing recessed portion 56 is recessed toward the floor panel 14 side with respect to this extended portion 62.

A first seal member 74 is provided on the lower surface 62A of the extended portion 62. This first seal member 74 is formed in a ring-shape by a tube-shaped elastic body of synthetic rubber or the like, and is joined by adhesive or the like to the lower surface 62A of the extended portion 62 along this lower surface 62A. When the flange portion 54 that will be described later is fixed to the edge portion 16A of the service hole 16, this first seal member 74 is pushed against the upper surface 30A of the battery upper cover 30 of the battery unit 20 by the lower surface 62A of the extended portion 62, so as to closely contact the upper surface 30A. As a result, the gap between the lower surface 62A of the extended portion 62 and the upper surface 30A of the battery upper cover 30 of the battery unit 20 is filled in, and the extended portion 62 is supported by the battery upper cover 30 via the first seal member 74.

The bent-back portion 52 is provided on an outer peripheral side end portion 62T that is on the opposite side of the extended portion 62 from the housing recessed portion 56. The bent-back portion 52 is bent toward the floor panel 14 side (i.e., upward in the vehicle vertical direction) at the outer peripheral side end portion 62T of the extended portion 62, and extends toward the edge portion 16A of the service hole 16 from the outer peripheral side end portion 62T. That is, the bent-back portion 52 is bent back toward the floor panel 14 side via the extended portion 62 from the lower end portion 60L of the inner peripheral wall portion 60 of the housing recessed portion 56. As a result, the bent-back portion 52 will easily deform (elastically deform) toward the inner peripheral wall portion 60 side with the outer peripheral side end portion 62T of the extended portion 62 as the fulcrum. Also, the transverse section of the bent-back portion 52 is formed in a rectangular tube-shape, and the bent-back portion 52 is arranged with a space between it and the inner peripheral wall portion 60 of the housing recessed portion 56. A lower end portion 52L of the bent-back portion 52 is connected to the outer peripheral side end portion 62T of the extended portion 62. As a result, an annular groove 76 that surrounds the housing recessed portion 56 is formed between the bent-back portion 52 and the inner peripheral wall portion 60 of the housing recessed portion 56. This groove 76 ensures space for the bent-back portion 52 to deform toward the housing recessed portion 56 side. In the vehicular battery mounting structure 10, the space is provided between an entire inner periphery (four inner surfaces) of the bent-back portion 52 and an entire outer periphery (four outer surfaces) of the inner peripheral wall portion 60. However, a space may be provided between at least one of four inner surfaces of the bent-back portion 52 and the corresponding outer surface(s) of the inner peripheral wall portion 60.

The flange portion 54 that serves as the fixing portion is formed on an upper end portion of the bent-back portion 52. This flange portion 54 protrudes out from an upper end portion of the bent-back portion 52 toward the outside (i.e., the side opposite the housing recessed portion 56), and is formed in an annular shape along this upper end portion. When the bent-back portion 52 and the housing recessed portion 56 are inserted into the service hole 16 from the vehicle cabin 18 side, this flange portion 54 engages with the edge portion 16A of the service hole 16 on an upper surface 14A of the floor panel 14. Also, a plurality of mounting holes 64 and 66 are formed in the flange portion 54 and the edge portion 16A of the service hole 16, respectively. The flange portion 54 is fixed to the edge portion 16A of the service hole 16 by bolts 68 that pass through these mounting holes 64 and 66, and nuts 70 that screw onto these bolts 68. That is, the service hole cover 50 is attached to the upper surface 14A of the floor panel 14 with the bent-back portion 52 and the housing recessed portion 56 protruding from the service hole 16 toward the battery unit 20 side.

A second seal member 72 is provided between the flange portion 54 of the service hole cover 50 and the edge portion 16A of the service hole 16. This second seal member 72 is formed in a ring-shape by an elastic body of synthetic rubber or the like, and is joined by adhesive or the like to a lower surface of the flange portion 54 along this lower surface. This second seal member 72 fills in a gap between the flange portion 54 and the edge portion 16A.

Next, a method for mounting the service hole cover to the floor panel will be described together with the operation of this example embodiment.

As shown in FIG. 3, first, the bent-back portion 52 and the housing recessed portion 56 of the service hole cover 50 are inserted into the service hole 16 formed in the floor panel 14, and an upper portion of the power supply circuit interrupting device 40 that protrudes toward the service hole 16 from the battery upper cover 30 of the battery unit 20 is arranged inside the housing recessed portion 56. As a result, the power supply circuit interrupting device 40 is covered from the floor panel 14 side by the housing recessed portion 56.

Next, the flange portion 54 formed on the upper end portion of the bent-back portion 52 is engaged with the edge portion 16A of the service hole 16, and the flange portion 54 is connected to the edge portion 16A of the service hole 16 by the bolts 68 and the nuts 70. As a result, the second seal member 72 provided on the lower surface of the flange portion 54 is pressed against the edge portion 16A of the service hole 16, such that the gap between the flange portion 54 and the edge portion 16A of the service hole 16 is filled in. Further, the first seal member 74 provided on the lower surface 62A of the extended portion 62 of the service hole cover 50 is pressed against the upper surface 30A or the battery upper cover 30, so the gap between the extended portion 62 and the battery upper cover 30 is also filled in.

Meanwhile, during maintenance of the battery unit 20, the flange portion 54 of the service hole cover 50 is disconnected from the edge portion 16A of the service hole 16 by removing the nuts 70 from the bolts 68, and the service hole cover 50 is removed from the service hole 16. Next, the operating member, not shown, of the power supply circuit interrupting device 40 is operated through the service hole 16 from inside the vehicle cabin 18, and causes a service plug, not shown, that is connected to the operating member to electrically interrupt the electrical circuit of the battery module 22 housed in the battery case 24. As a result, the battery unit 20 is able to be easily removed from the vehicle 12, so the ability to perform maintenance on the battery unit 20 improves.

As described above, in this example embodiment, rainwater and dust that have gotten between the floor panel 14 and the battery upper cover 30 from in front of the battery unit 20 in the vehicle longitudinal direction, as shown by the arrows W in FIG. 1, for example, are inhibited from entering the vehicle cabin 18 by filling in the gap between the flange portion 54 of the service hole cover 50 and the edge portion 16A of the service hole 16 with the second seal member 72. Accordingly, the inside of the vehicle cabin 18 is inhibited from becoming dirty and the like.

Also, the rainwater and dust described above (arrows W) are inhibited from getting into the housing recessed portion 56 of the service hole cover 50 by filling in the gap between the extended portion 62 of the service hole cover 50 and the battery upper cover 30 with the first seal member 74. Accordingly, failure of, or damage to, the power supply circuit interrupting device 40 arranged in the housing recessed portion 56 is inhibited. Therefore, the durability of the battery unit 20 improves.

Furthermore, the bent-back portion 52 of the service hole cover 50 is bent back from the lower end portion 60L of the inner peripheral wall portion 60 of the housing recessed portion 56 toward the floor panel 14 side via the extended portion 62, and is able to easily deform toward the housing recessed portion 56 side with the outer peripheral side end portion 62T of the extended portion 62 as the fulcrum. Therefore, when the floor panel 14 is displaced horizontally with respect to the battery unit 20 due to a vehicle collision, and the bent-back portion 52 of the service hole cover 50 is consequently pressed toward the power supply circuit interrupting device 40 side by the edge portion 16A of the service hole 16, the bent-back portion 52 deforms (i.e., elastically deforms) toward the housing recessed portion 56 side with the outer peripheral side end portion 62T of the extended portion 62 as the fulcrum, such that the gap between the bent-back portion 52 and the inner peripheral wall portion 60 becomes narrower, as shown by the alternate long and two short dashes line in FIG. 3. As a result, the horizontal displacement of the floor panel 14 with respect to the battery unit 20 is absorbed, so a shift in the position of the housing recessed portion 56 in the horizontal direction with respect to the power supply circuit interrupting device 40 is inhibited. Therefore, contact between the inner peripheral wall portion 60 of the housing recessed portion 56 and the power supply circuit interrupting device 40 is able to be inhibited.

Moreover, in this example embodiment, when the flange portion 54 of the service hole cover 50 is connected to the edge portion 16A of the service hole 16 by the bolts 68 and the nuts 70 as described above, the first seal member 74 provided on the lower surface 62A of the extended portion 62 of the service hole cover 50 is pressed against the upper surface 30A of the battery upper cover 30 of the battery unit 20, so the extended portion 62 is supported by the battery upper cover 30 via the first seal member 74. As a result, a shift in the position of the inner peripheral wall portion 60 in the horizontal direction with respect to the battery unit 20 is inhibited by friction force generated between the first seal member 74 and the upper surface 30A of the battery upper cover 30. Therefore, when the bent-back portion 52 is pressed toward the power supply circuit interrupting device 40 side of the battery unit 20 by the edge portion 16A of the service hole 16, the bent-back portion 52 will more easily deform toward the housing recessed portion 56 side with the outer peripheral side end portion 62T of the extended portion 62 as the fulcrum. Therefore, contact between the inner peripheral wall portion 60 of the housing recessed portion 56 and the power supply circuit interrupting device 40 can be further inhibited.

Furthermore, the top wall portion 58 of the housing recessed portion 56 is arranged at the same height as the flange portion 54, so the top wall portion 58 does not protrude toward the vehicle cabin 18 side from the flange portion 54. Therefore, the appearance of the service hole cover 50 is improved compared with a structure in which the top wall portion 58 of the housing recessed portion 56 protrudes toward the vehicle cabin 18 side from the upper surface 54A of the flange portion 54. Moreover, with a structure in which the top wall portion 58 of the housing recessed portion 56 protrudes toward the vehicle cabin 18 side from the upper surface 54A of the flange portion 54, the top wall portion 58 may be pressed toward the battery unit 20 side when the service hole cover 50 is stepped on by an occupant, for example. In contrast, with this example embodiment, the top wall portion 58 of the housing recessed portion 56 is arranged at the same height as the flange portion 54, so even if the service hole cover 50 is stepped on by an occupant, the top wall portion 58 of the housing recessed portion 56 is inhibited from being pressed toward the battery unit 20 side. Therefore, damage or the like to the service hole cover 50 is inhibited.

In addition, with this example embodiment, the number of parts is reduced, compared with the related art (JP 2009-

083601 A, for example) that is provided with a boot member and a cap member, by integrally forming the housing recessed portion 56 in which the power supply circuit interrupting device 40 of the battery unit 20 is housed with the service hole cover 50 that covers the service hole 16. Therefore, the mountability of the service hole cover 50 to the floor panel 14 improves. Further, the service hole cover 50 is able to easily be removed from the floor panel 14, so the ability to perform maintenance on the battery unit 20 improves.

Next, a modified example of the example embodiment described above will be described.

In the example embodiment described above, the first seal member 74 is joined by adhesive or the like to the lower surface 62A of the extended portion 62 of the service hole cover 50, but the first seal member 74 may also be joined by adhesive or the like to the upper surface 30A of the battery upper cover 30 of the battery unit 20. Also in the example embodiment described above, the first seal member 74 is joined by adhesive or the like to the lower surface of the flange portion 54 of the service hole cover 50, but the first seal member 74 may also be joined by adhesive to the upper surface 14A of the floor panel 14, or it may be simply be arranged between the flange portion 54 and the floor panel 14 when attaching the service hole cover 50 to the floor panel 14, without being joined to the flange portion 54 and the floor panel 14. Moreover, the first seal member 74 and the second seal member 72 need simply be provided if necessary, and may be omitted is appropriate. If the first seal member 74 is omitted, it is desirable to have the extended portion 62 contact the battery upper cover 30 so as to directly support the extended portion 62 with the battery upper cover 30.

Also, in the example embodiment described above, the top wall portion 58 of the housing recessed portion 56 of the service hole cover 50 is arranged at the same height as the flange portion 54, but the invention is not limited to this. The top wall portion 58 of the housing recessed portion 56 may also be arranged in a position higher than (i.e., on the vehicle cabin 18 side of) the flange portion 54, or in a position lower than (i.e., on the battery unit 20 side of) the upper surface 54A of the flange portion 54. With a structure in which the top wall portion 58 of the housing recessed portion 56 is arranged in a position lower than the flange portion 54, even if the service hole cover 50 is stepped on by an occupant, the top wall portion 58 is inhibited from being pressed toward the battery unit 20 side, just as in the example embodiment described above. Therefore, damage or the like to the service hole cover 50 is inhibited.

Also in the example embodiment described above, the top wall portion 58 of the housing recessed portion 56 is formed in a flat plate-shape, but the invention is not limited to this. For example, the top wall portion 58 may also be bent upward, in the vehicle vertical direction, in a protruding shape. In this case, damage or the like to the service hole cover 50 is able to be inhibited by having the portion of the bottom wall portion that is positioned farthest toward the vehicle cabin 18 side be the top portion of the housing recessed portion 56, and having this top portion not protrude toward the vehicle cabin 18 side from the flange portion 54. Furthermore, the shape of the flange portion 54 that serves as the fixing portion may be modified as appropriate.

Also in this example embodiment, the power supply circuit interrupting device 40 is given as an example of the operating portion of the battery unit 20, but the invention is not limited to this. The operating portion of the battery unit 20 need simply be configured to include replaceable wear-out parts (i.e., expendable parts) and operating members that can be operated from the vehicle cabin 18 side through the service hole 16, and the like.

While the invention has been described with reference to example embodiments thereof, it should be understood that the invention is not limited to these example embodiments. That is, the example embodiments and various modified examples may also be combined as appropriate, and the invention may be carried out in any of a variety of modes without departing from the scope of the invention.

What is claimed is:

1. A service hole cover mounting structure comprising:
    a vehicle floor in which a service hole is formed, and below which, in a vehicle vertical direction, a battery unit having an operating portion that protrudes toward the service hole is arranged; and
    a service hole cover including
        a housing recessed portion that is arranged in the service hole and that covers the operating portion, and
        a bent-back portion that is bent back toward an outside of the housing recessed portion and toward the vehicle floor side from a lower end portion of the housing recessed portion, and that attaches to the vehicle floor.

2. The service hole cover mounting structure according to claim 1, wherein the service hole cover has a fixing portion that is provided on an upper end portion of the bent-back portion and is fixed to an upper surface of the vehicle floor; and the service hole cover structure further includes a second seal member that is provided along the fixing portion, and fills in a gap between the fixing portion and the upper surface of the vehicle floor.

3. The service hole cover mounting structure according to claim 2, wherein a top portion of the housing recessed portion is arranged in a position that is the same height as the fixing portion or in a position that is lower than the fixing portion.

4. A vehicular battery mounting structure comprising:
    the service hole cover mounting structure according to claim 1; and
    the battery unit that has the operating portion that protrudes toward the service hole, and that is arranged below the vehicle floor in the vehicle vertical direction.

5. The vehicular battery mounting structure according to claim 4, wherein the housing recessed portion surrounds the operating portion, the operating portion including a power circuit interrupt device.

6. The vehicular battery mounting structure according to claim 4, wherein the operating portion is positioned in the housing recessed portion.

7. A service hole cover mounting structure comprising:
    a vehicle floor having a service hole; and
    a service hole cover including
        a housing recessed portion that is arranged in the service hole and that covers an operating portion of a battery unit that protrudes toward the service hole, and
        an outer housing portion whose first end is continuous with a lower end portion of the housing recessed portion, and whose second end attaches to the vehicle floor, the outer housing portion being arranged outside the housing recessed portion, and a space being provided between an outer periphery of the housing recessed portion and an inner periphery of the outer housing portion.

8. A service hole cover mounting structure comprising:
    a vehicle floor in which a service hole is formed, and below which, in a vehicle vertical direction, a battery unit having an operating portion that protrudes toward the service hole is arranged; and a service hole cover including
a housing recessed portion that is arranged in the service hole and that covers the operating portion, and
a bent-back portion that is bent back toward an outside of the housing recessed portion and toward the vehicle floor side from a lower end portion of the housing recessed portion, and that attaches to the vehicle floor,
wherein the service hole cover has an extended portion that extends toward an outside of the housing recessed portion from the lower end portion of the housing recessed portion; the service hole cover mounting structure further includes a first seal member that is provided in a gap between the extended portion and the battery unit, and that fills in the gap; the bent-back portion is bent back from the lower end portion of the housing recessed portion toward the vehicle floor side via the extended portion; and the first seal member is provided along the extended portion.

9. The service hole cover mounting structure according to claim 8, wherein the service hole cover has a fixing portion that is provided on an upper end portion of the bent-back portion and is fixed to an upper surface of the vehicle floor; and the service hole cover structure further includes a second seal member that is provided along the fixing portion, and fills in a gap between the fixing portion and the upper surface of the vehicle floor.

10. The service hole cover mounting structure according to claim 9, wherein a top portion of the housing recessed portion is arranged in a position that is the same height as the fixing portion or in a position that is lower than the fixing portion.

11. A vehicular battery mounting structure comprising:
the service hole cover mounting structure according to claim 8; and
the battery unit that has the operating portion that protrudes toward the service hole, and that is arranged below the vehicle floor in the vehicle vertical direction.

12. The vehicular battery mounting structure according to claim 11, wherein the housing recessed portion surrounds the operating portion, the operating portion including a power circuit interrupt device.

13. The vehicular battery mounting structure according to claim 11, wherein the operating portion is positioned in the housing recessed portion.

* * * * *